(12) United States Patent
Bleau et al.

(10) Patent No.: US 7,518,654 B2
(45) Date of Patent: Apr. 14, 2009

(54) APPARATUSES FOR A CAMERA HEAD ENCLOSURE DEVICE FOR FACILITATING IMPROVED IMAGING

(75) Inventors: Charles Bleau, Atlanta, GA (US); Mark P. McJunkin, Atlanta, GA (US); Dean Quoc Nguyen, Atlanta, GA (US); Garry Thomas Motter, Stone Mountain, GA (US); Raymond C. DuVarney, Lilburn, GA (US)

(73) Assignee: SciMeasure Analytical Systems, Inc., Decatur, GA (US)

( * ) Notice: Subject to any disclaimer, the term of this patent is extended or adjusted under 35 U.S.C. 154(b) by 903 days.

(21) Appl. No.: 10/982,064

(22) Filed: Nov. 5, 2004

(65) Prior Publication Data

US 2005/0099521 A1 May 12, 2005

Related U.S. Application Data

(60) Provisional application No. 60/518,262, filed on Nov. 7, 2003.

(51) Int. Cl.
*H04N 5/225* (2006.01)
(52) U.S. Cl. .................. 348/373; 348/374; 348/375; 348/340
(58) Field of Classification Search ............. 348/340, 348/373–376; 396/529
See application file for complete search history.

(56) References Cited

U.S. PATENT DOCUMENTS 3,930,720 A * 1/1976 Uesugi ................ 359/695
4,594,613 A * 6/1986 Shinbori et al. ............ 348/340
5,040,068 A * 8/1991 Parulski et al. ............ 348/376
5,602,721 A 2/1997 Slade et al.

(Continued)

OTHER PUBLICATIONS

Ludl Electronic Products Ltd., It Looks Different... "The MAC 5000 system is the new standard in modular automation for scientific applications.", Retrieved Jan. 21, 2005 from Internet Site http://www.ludl.com/Products/BioScience/MAC5000/Mac5000Start.html, p. 1 of 1.

(Continued)

*Primary Examiner*—David L Ometz
*Assistant Examiner*—Antoinette T Spinks
(74) *Attorney, Agent, or Firm*—Alston & Bird LLP (57) ABSTRACT

This invention relates to a camera head enclosure apparatus configured to allow the interchangeability of photo-electric pixel arrays for use in various applications. A personality plate specifically configured to receive and secure a photo-electric pixel array of a particular configuration provided on a chip is disclosed. The invention allows a user to interchange photo-electric pixel arrays, and their respective personality plates, while using the same camera head enclosure, thus enabling the camera head enclosure to be adapted to an entirely different photo-electric pixel array and eliminating the need to custom make camera head enclosures for each application. One embodiment of the camera head enclosure apparatus disclosed further includes a plurality of carriers configured to hold a respective plurality of circuit boards associated with the particular photo-electric pixel array selected. In addition, in one embodiment of the disclosed invention, the camera head enclosure apparatus includes an aperture adjustment assembly which permits alignment of the camera aperture with the photo-electric pixel array to provide the capability to accommodate different types, sizes, and configurations of photo-electric pixel arrays.

38 Claims, 9 Drawing Sheets

U.S. PATENT DOCUMENTS

| | | | |
|---|---|---|---|
| 5,731,834 A * | 3/1998 | Huot et al. | 348/374 |
| 5,838,548 A | 11/1998 | Matz et al. | |
| 6,038,126 A | 3/2000 | Weng | |
| 6,628,339 B1 * | 9/2003 | Ferland et al. | 348/374 |
| 6,698,851 B1 | 3/2004 | Ludl | |
| 6,956,615 B2 * | 10/2005 | Nakagishi et al. | 348/374 |
| 2005/0285973 A1 * | 12/2005 | Singh et al. | 348/374 |

OTHER PUBLICATIONS

Ludl Electronic Products Ltd., Mac 5000 Controller System, Catalog, Retrieved Jan. 21, 2005 from Internet Site http://www.ludl.com/Products/PDFspecs/MAC%205000%20Catalog%202003.pdf, pp. 1-20.

* cited by examiner

APPARATUSES FOR A CAMERA HEAD ENCLOSURE DEVICE FOR FACILITATING IMPROVED IMAGING

CROSS-REFERENCE TO RELATED APPLICATIONS

This application claims priority from provisional application No. 60/518,262 entitled "Camera Head Enclosure," which was filed on Nov. 7, 2003 and which is hereby incorporated by reference.

FIELD OF THE INVENTION

This invention relates to a camera head enclosure apparatus that can be used to house a camera to receive and image a source of light in a wide variety of applications. The apparatus encloses and protects a camera's charge-coupled device (CCD) or other photo-electric pixel array, and one or more related circuit boards, for use in receiving and imaging a source of light to generate electronic signals for use by an external device. The camera head apparatus can be used for optical imaging in a wide range of applications including astronomy, medicine, manufacturing, and other fields.

BACKGROUND OF THE INVENTION

CCD arrays have been in commercial use for several years. Such devices are essentially two-dimensional arrays of photodiodes or the like, that each are capable of generating an electrical signal in response to receiving light. CCD arrays are used for a wide variety of purposes, including astronomy to image distant stars, planets, and space phenomenon, in the medical industry to image biological matter or phenomenon on a microscopic level, and for imaging objects in contexts such as manufacturing production lines. This is to mention only a few applications, and numerous others exist in a wide variety of industries.

CCD arrays and related circuit boards are often housed within a camera head enclosure. The enclosure protects the pixel array and related circuit boards from damage due to dust, debris, shock, impact, and/or ambient conditions. Due to the fact that CCD and other pixel arrays are required for a wide range of uses, the nature and characteristics of the pixel arrays commercially available vary correspondingly. CCD arrays can differ in terms of their physical size and dimensions, their sensitivity to received light, the light wavelength to which they are sensitive, the speed at which they are clocked to extract an electronic signal(s), and other factors. In addition, a CCD array may be associated with one or more related circuit boards serving various functions, such as driving the CCD array, or pre-amplifying signals to and from the CCD array, among others. As a result of the need to select the desired pixel array and related circuit boards needed to provide target functionality, it is usually required to make a custom camera head enclosure to house a CCD array and related circuit boards. Such custom-designed and custom-made camera head enclosures can be prohibitively expensive. While the expense of making a custom camera head enclosure may be acceptable if the purpose to which the camera is to be used is static, this is seldom the case. Instead, if the user desires to use a camera for a different purpose other than that originally intended, the user will require an entirely different camera head to be designed and made. This necessitates the expense of designing and building an entirely different camera head enclosure to house the pixel array and circuit boards required for the new application. Thus, there is a pronounced and longstanding need for a camera head enclosure that enables ready replacement and/or interchangeability of elements of the camera, without requiring redesign or reconfiguration.

SUMMARY OF THE INVENTION

The disclosed apparatus, in its various embodiments, overcomes the disadvantages of previous camera head enclosures noted above.

In one embodiment, a camera head enclosure apparatus in accordance with the invention comprises at least one carrier defining a mounting portion configured to receive and secure a circuit board. The invention can also comprise front and rear plates on opposing front and rear sides of the carrier(s). The front and rear plates have heat fins thereon to sink heat generated by the circuit boards to ambient air. The front and rear plates and carrier(s) define aligned apertures for receiving a bolt or other connection device, to hold the front and rear plates and carriers together to at least partially enclose the circuit boards mounted to respective carrier(s). The carrier(s) can be configured as U-shaped members, and the apparatus can further comprise one or more cover plates to enclose respective open ends of the U-shaped members. The apparatus can be configured so that the front end of the front plate has a fastening portion defining two inner apertures, spaced slots, and outer apertures. The apparatus can comprise a personality plate which acts as a mounting plate to secure the pixel or CCD array to the rest of the camera head enclosure apparatus. The personality plate is configured appropriately for the pixel or CCD array with which it is to be used. In other words, each personality plate varies in size and the position of its mounting holes so that it can receive and secure a specific pixel or CCD array with which it is associated. Therefore, by the simple expedient of selecting or replacing a personality plate with one appropriate for the pixel array desired for the intended application, different pixel or CCD arrays can be used in the apparatus. The personality plate defines two apertures aligning with those of the inner apertures of the front plate, to receive respective screws or other fasteners to hold the personality plate to the front plate. The CCD or other pixel array can be provided on a chip or circuit board that has apertures defined therein to correspond to outer apertures defined in the personality plate. Two connection strips, standard with many CCD arrays, have parallel, spaced conductive pins that can be inserted through corresponding holes of the CCD array chip or circuit board to make connections thereon, and further through the slots defined in the front plate to make connection to respective connectors to the circuit board mounted to the carrier on the rear side of the front plate. If more than one circuit board is used, then corresponding connectors on the opposite side can be joined with the connectors of the adjacent circuit board, and so on, so that the connection bus formed by the interjoined connectors on front and back sides of the circuit boards in effect runs transversely through the major surfaces of the circuit boards. The apparatus can further comprise an aperture adjustment assembly which permits alignment of the camera aperture with the pixel array to provide the capability to accommodate different pixel arrays which differ by one or more of type, size, and configuration. Because the position of the pixel array on its chips or circuit board varies depending upon the particular unit, the ability to move the aperture and align it with the pixel array permits the CCD array to receive light directly from the object to be observed. The aperture adjustment assembly comprises a back ring, an aperture plate, and a front cover. The back ring can be a planar rectangular configuration with a relatively large central opening defined therein, and defining a plurality of apertures or the like to receive bolts or other fasteners to hold the aperture adjustment assembly together. The aperture plate defines a central opening for permitting light to pass from the exterior of the apparatus therethrough to the pixel array. The aperture plate can include a tube or the like formed integrally therewith, that limits the angle at which light is able to pass through the aperture. In addition, the aperture plate defines scalloped portions in its corner areas to permit a degree of play for alignment of the opening of the aperture plate with the pixel array. The front cover defines a continuous wall to receive and enclose the aperture plate and rear plate. The front cover can define spaced apertures to receive bolts with threaded ends, or another type of fastener, that extends transversely through corresponding apertures of the front plate, carriers, and into threaded holes defined in the rear plate, to hold the entire assembly together. Upon tightening the bolts or other connection devices, the overall assembly can be held together to enclose the pixel array and related circuit boards therein. In addition, the tightening of the bolts or connection devices fixes the position of the aperture plate between the front cover and back ring, to lock registration of the aperture plate's opening to the pixel array.

DETAILED DESCRIPTION OF THE DRAWINGS

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements.

Figure 1:
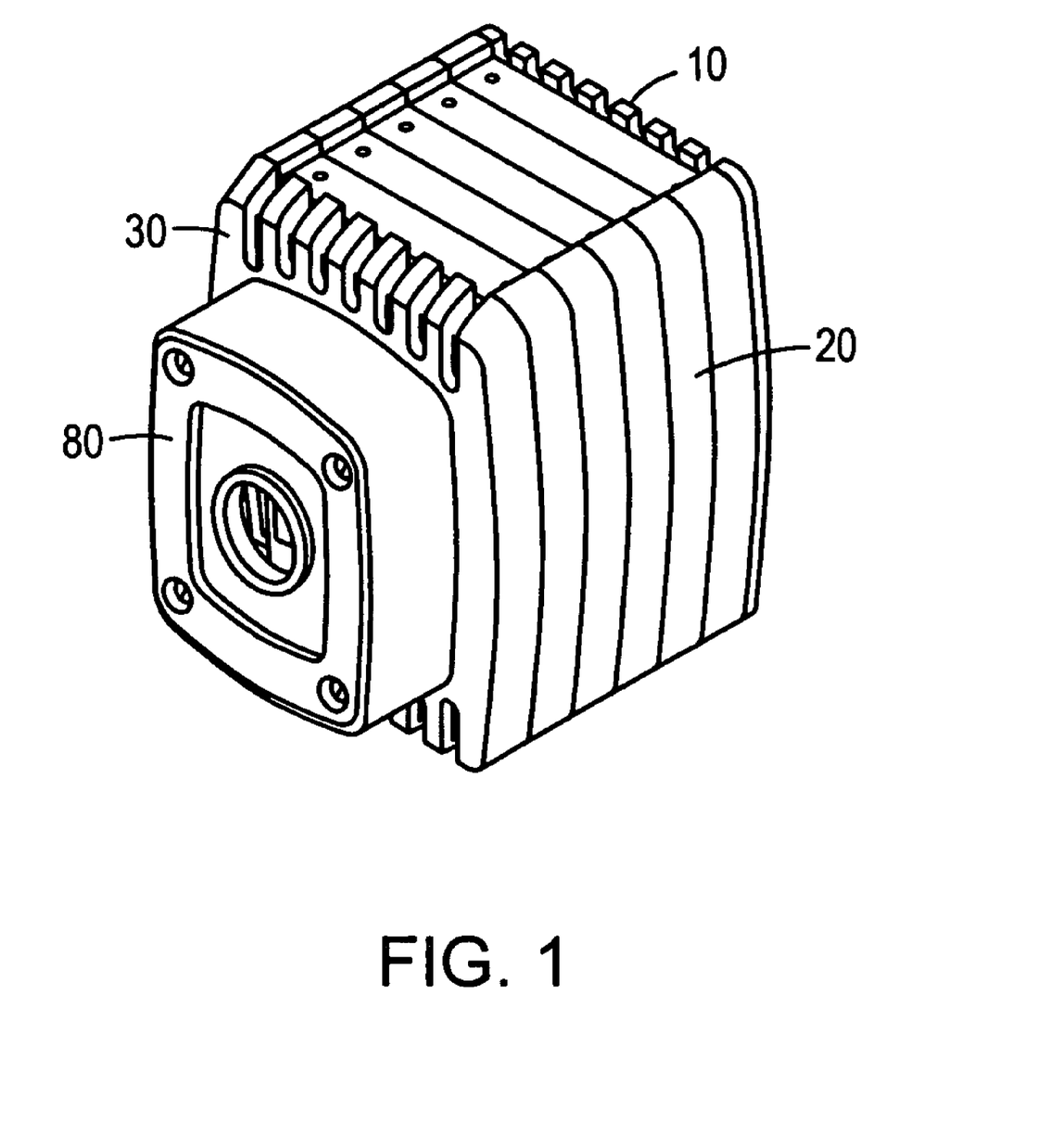
FIG. 1 is a perspective view of a camera head enclosure embodying the invention.
Figure 2:
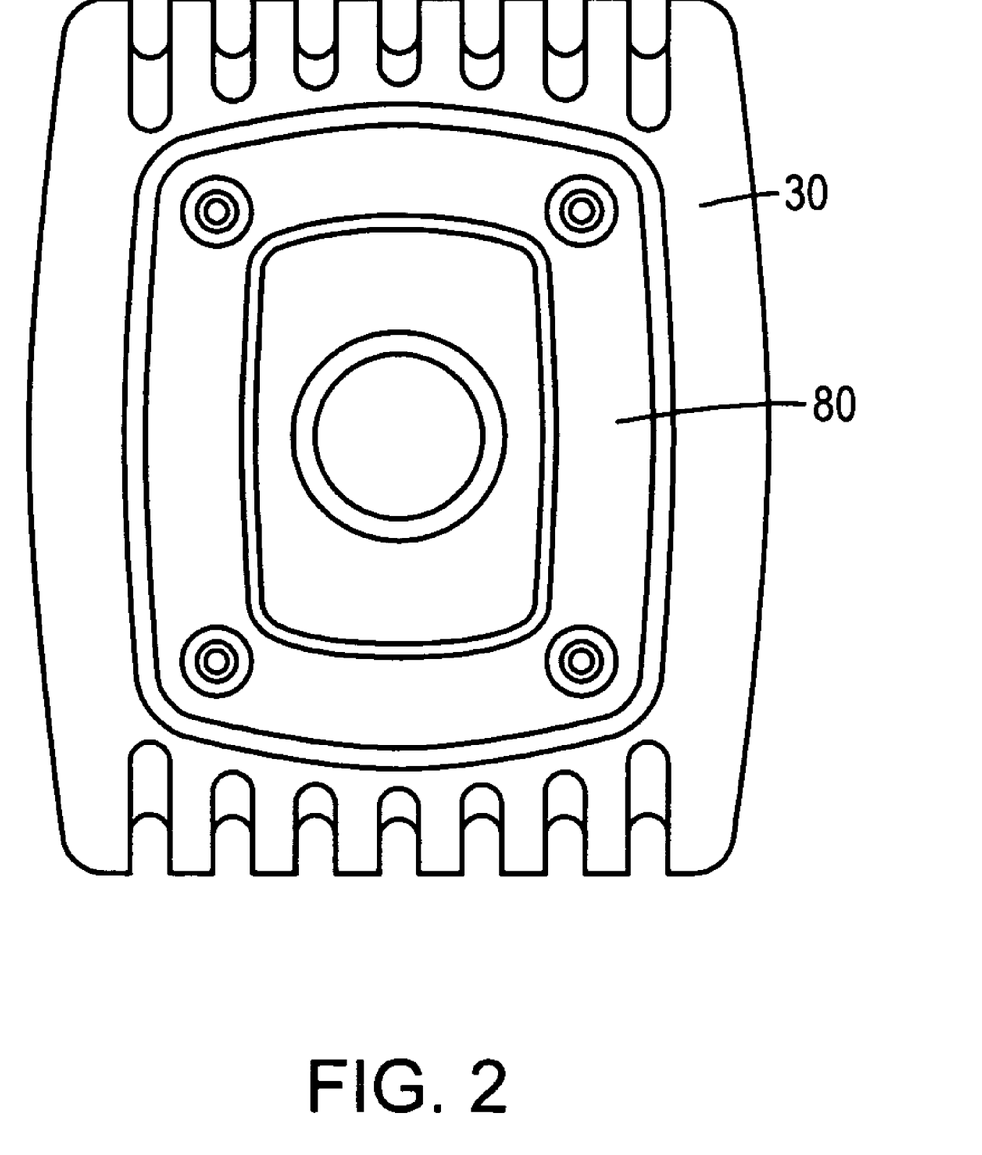
FIG. 2 is a front elevation view of the front of a camera head embodying the invention.
Figure 3:
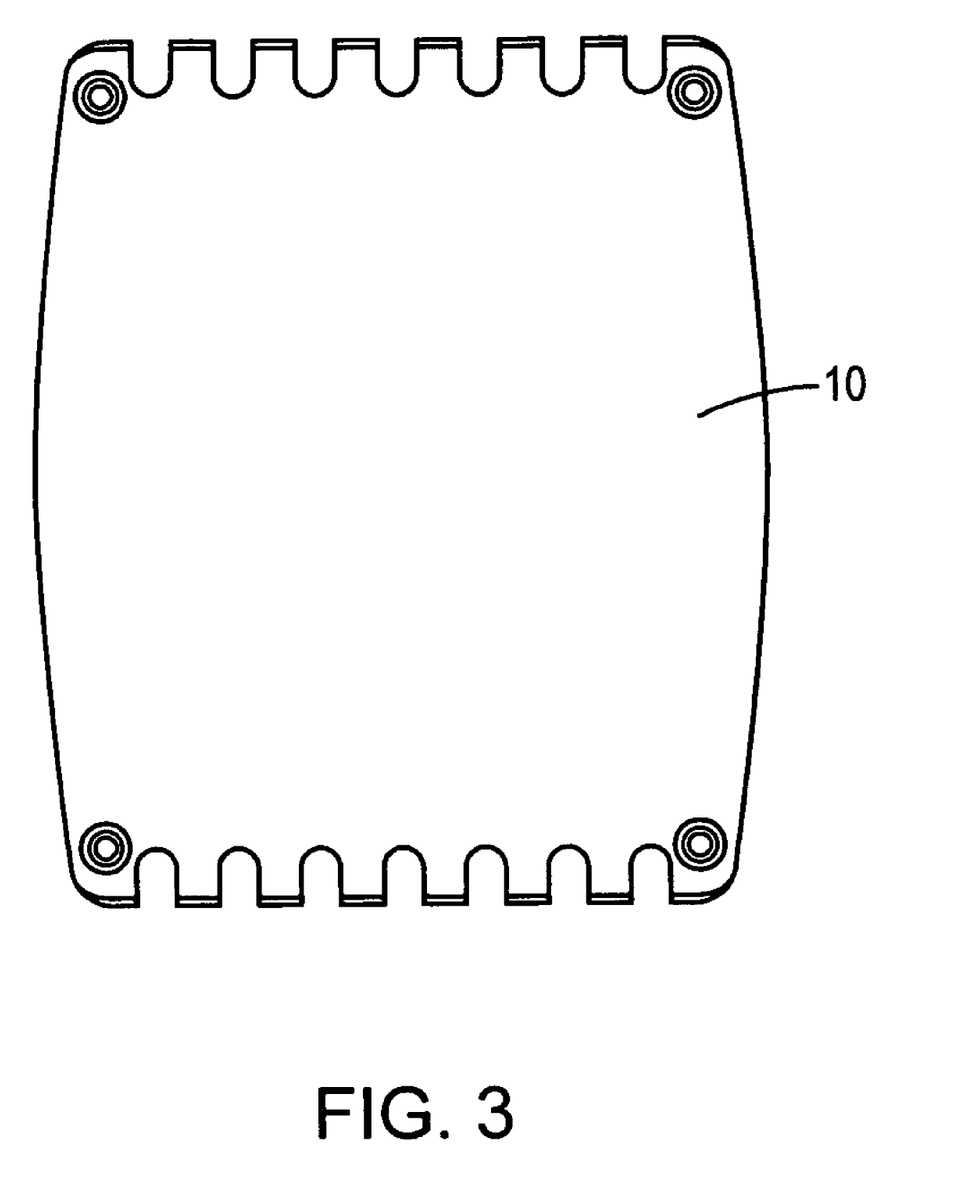
FIG. 3 is a rear elevation view of the back of a camera head embodying the invention.
Figure 4:
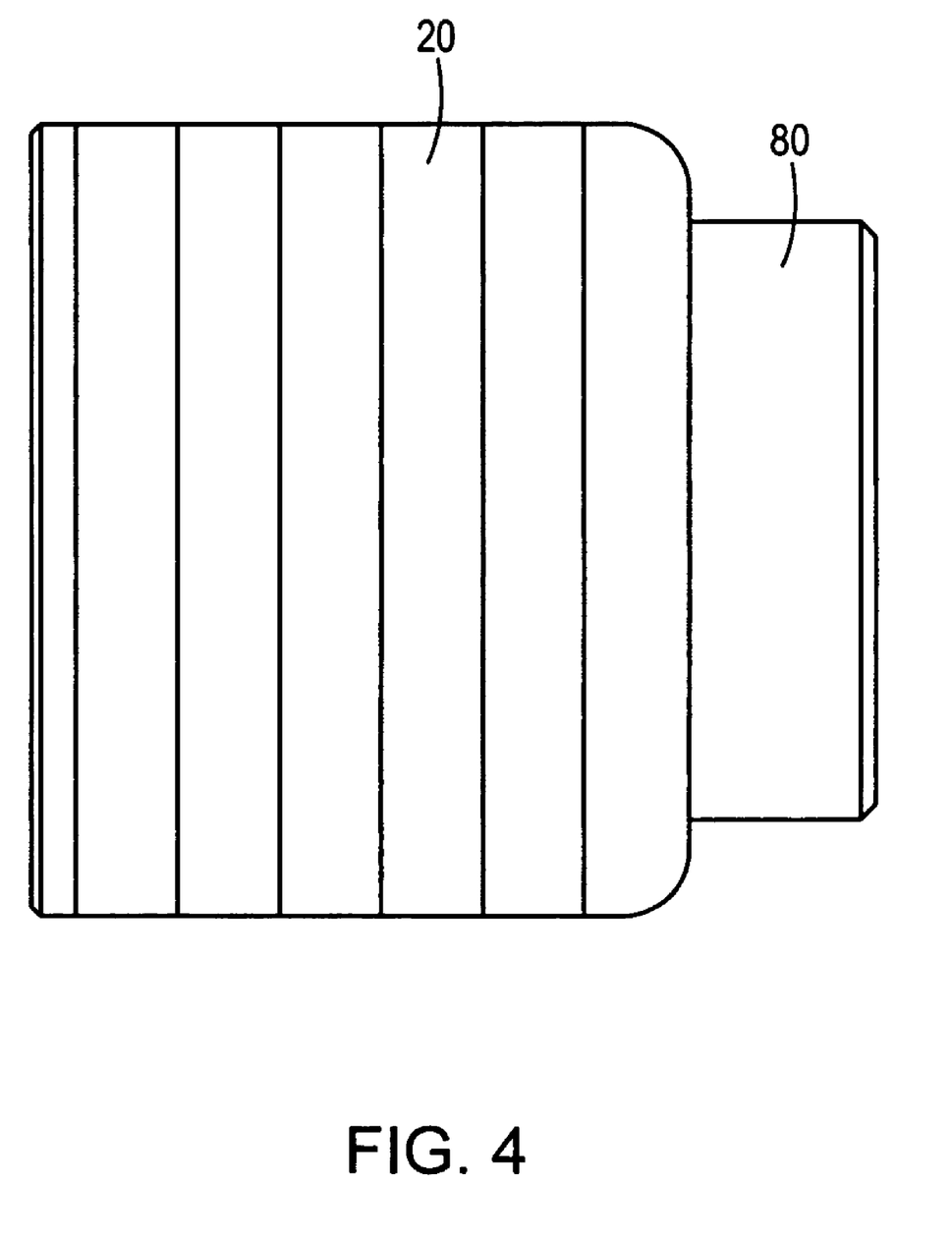
FIG. 4 is a side elevation view of one side of a camera head embodying the invention.
Figure 5:
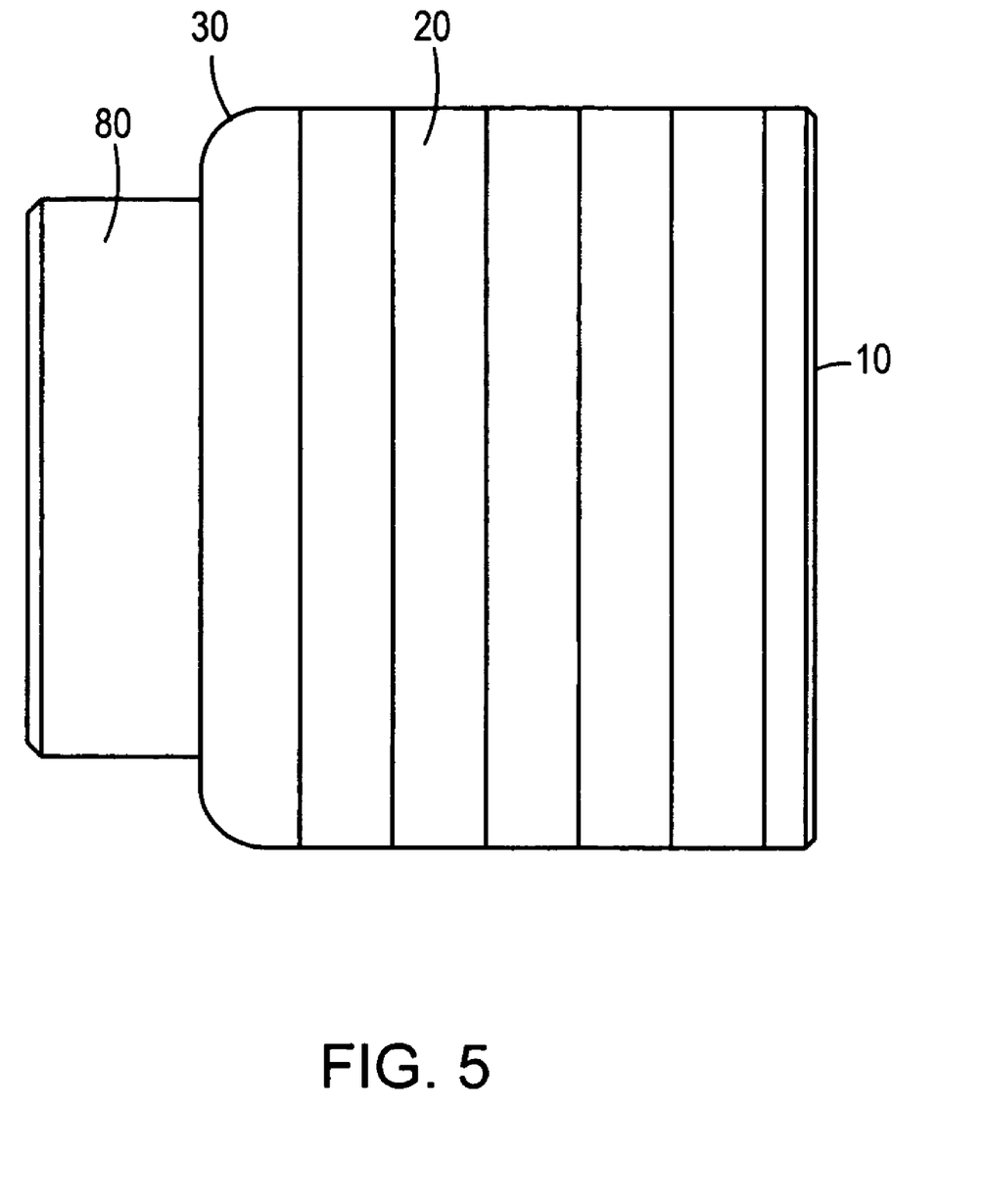
FIG. 5 is a side elevation view of the other side of a camera head embodying the invention.
Figure 6:
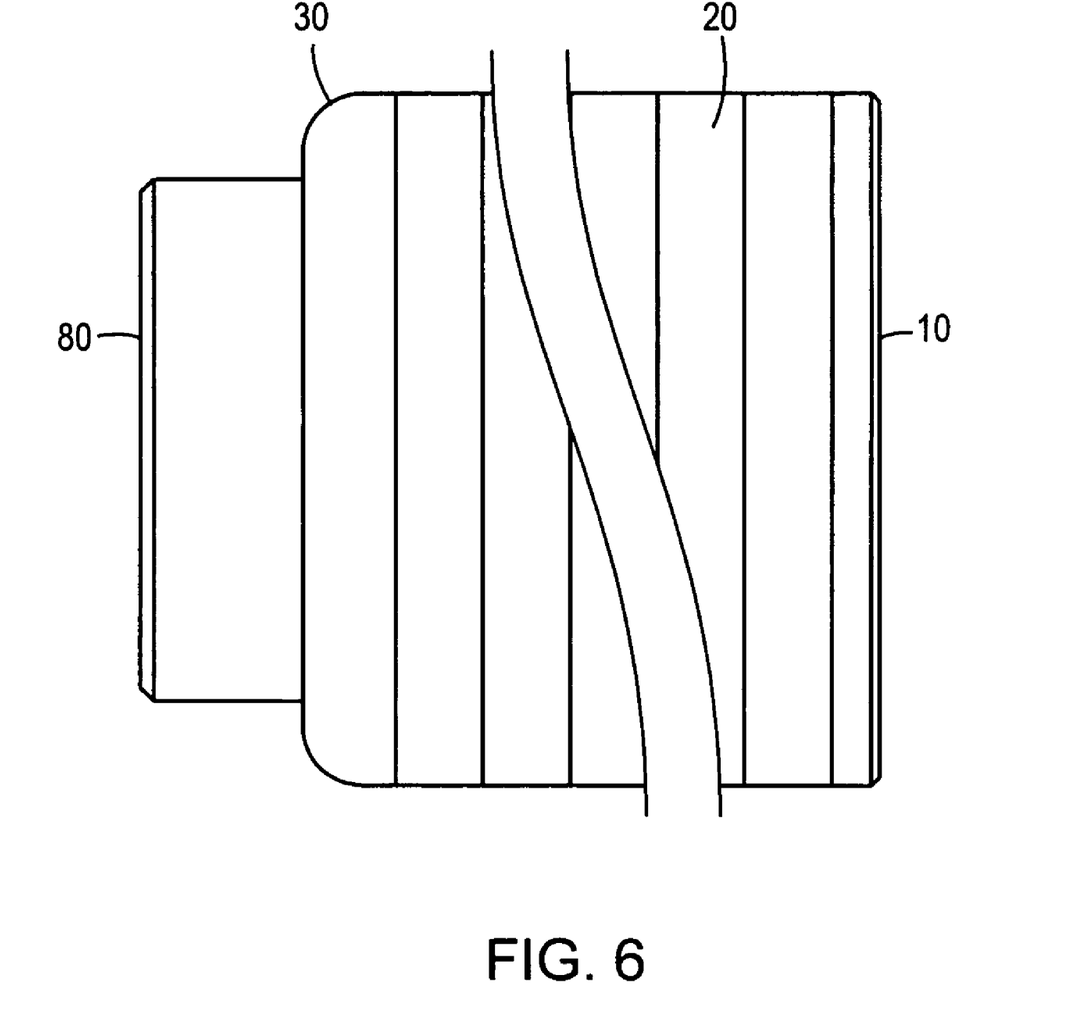
FIG. 6 is a side elevation view of a camera head embodying the invention.
Figure 7:
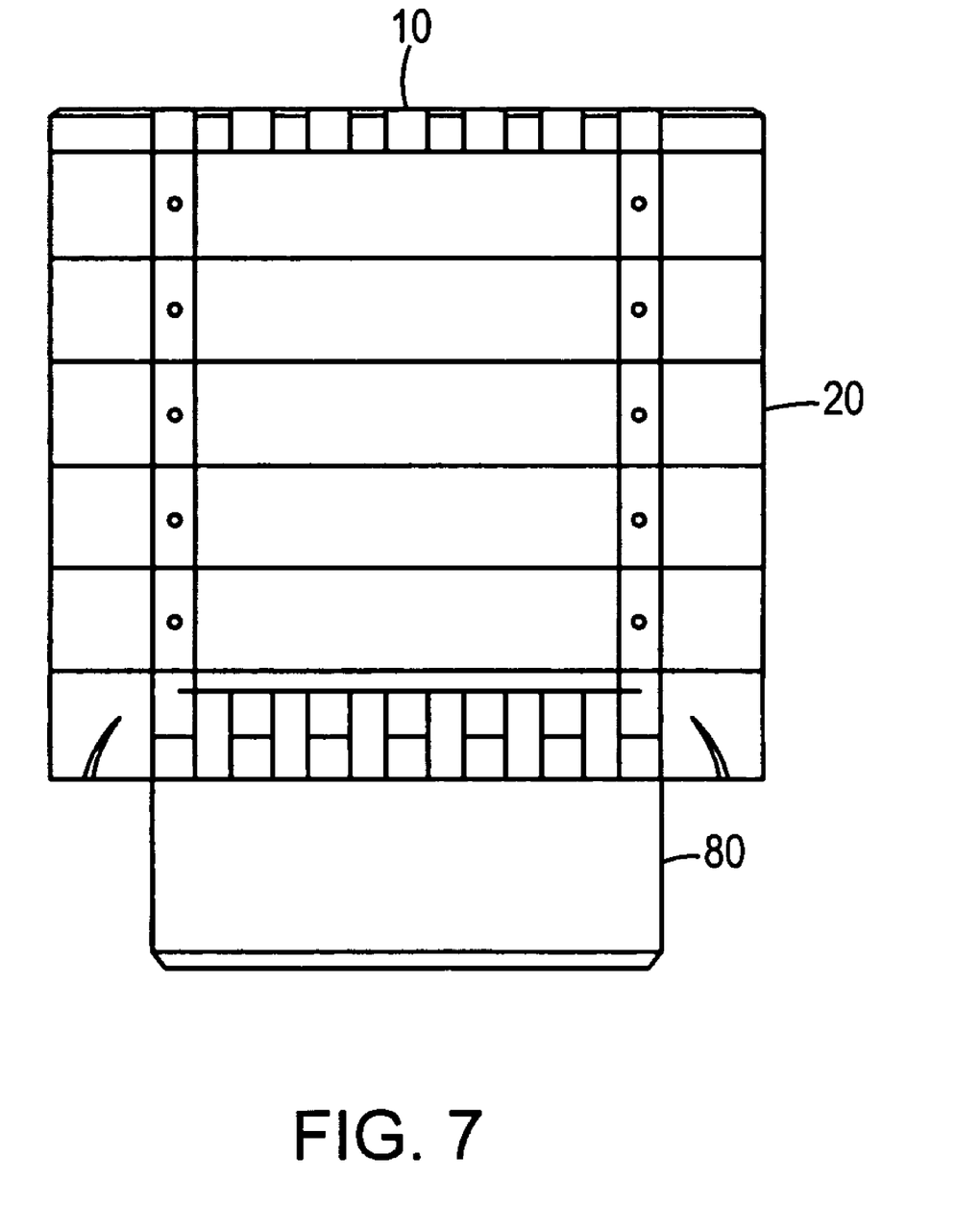
FIG. 7 is a top plan view of the top of a camera head embodying the invention.

Referring now in more detail to the drawings, in which like numerals refer to like parts throughout the several views, FIG. 1 shows a perspective view of a camera head enclosure embodying the invention. A plurality of carriers 20, preferably in a U shape, are aligned and connected to each other. Two of said carriers 20 that are positioned at the two ends of the connection of a plurality of carriers are fastened to a rear plate 10 and a front plate 30 respectively. The front plate 30 is further attached to a front cover 80.

Figure 9:
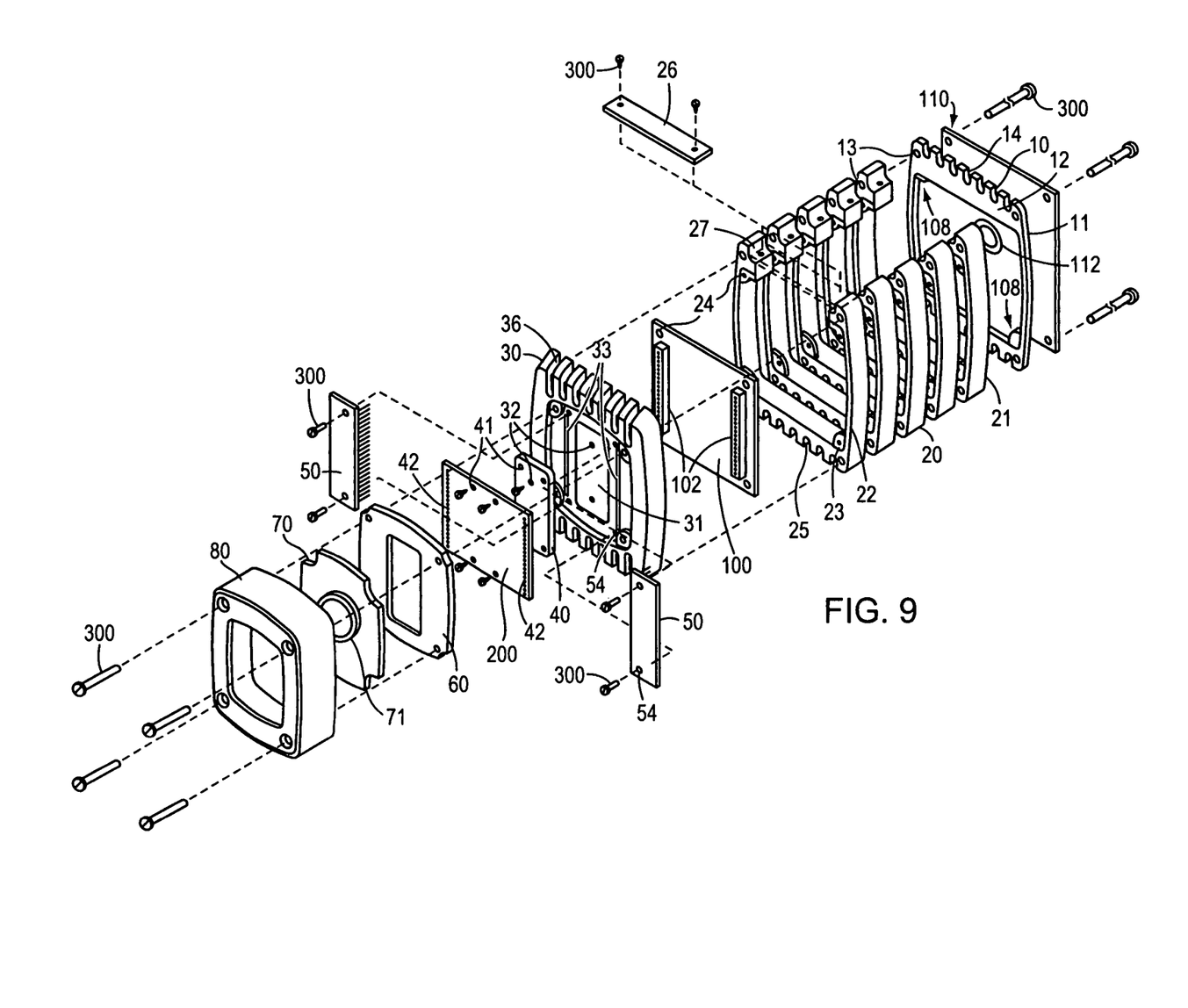
FIG. 9 is an exploded view of a camera head embodying the invention.

Turning to FIG. 9, the rear plate 10 defines a wall surface 11 on the back side of the plate and an engagement portion 12 on the front side of the plate. The engagement portion 12 contains openings 13 aligned with corresponding openings of the carriers. The rear plate 10 also defines an array of heat fins 14 on the top and bottom of the plate to allow circulation of air to sink heat generated by enclosed pixel array and circuit board components from the enclosure.

Each carrier 20 defines a first engagement portion 21 on the back of the carrier and a second engagement portion 22 on the front side of the carrier. A first engagement portion 21 of one carrier is configured for joining with either a second engagement portion 22 of another carrier or the engagement portion 12 of the rear plate 10. In that way a plurality of carriers 20 plus a rear plate 10 may be stacked together via one or more fastener 300 (including a bolt, a screw, a rod, a guide spin, adhesive, or other connection device) fed through aligned openings 13. A carrier 20 further includes mounting portions 23 for mounting a circuit board 100 to the carrier by a fastener going through aligned openings 24. An array of heat fins 25 are formed along the bottom of a carrier 20 to allow air passage for cooling the enclosed circuit boards. A strip 26 may be placed in a bracket 27 on the top of every U-shaped carrier 20 as a separate cover, or can be integrated as part of a carrier, thereby making the carrier closed like a rectangular ring.

The front plate 30 defines a first fastening portion 31 in the middle of the plate for connecting with a personality plate 40 via threaded screws or other fastener 300 fed through matching openings 32. Additional fasteners 300 such as bolts or screws fed through matching openings 41 can be used to mount the pixel array 200 to a personality plate 40. The use of the word 'personality' is thus not being used herein in its ordinary sense, but is instead a figurative reference to the fact that the personality plate accommodates the 'personality' of a pixel or CCD array according to one or more factors, such as its type, size, configuration, etc. The front plate 30 also defines parallel spaced slots 33. Two connector strips 50, standard with most CCD arrays, having parallel spaced conductive pins, are inserted through respective rows of holes 42 in the pixel array 200. The holes 42 are defined by conductive surfaces making electrical connection to the photo-diodes of the pixel array 200. The conductive pins of the connection strip(s) 50 extend further through the slots 33 of front plate 30, and into connectors 102 on the circuit board 100 to make electrical connection with the circuit on the board 100. On its reverse side, the circuit board 100 can have pins electrically connected with the conductors in the holes of the connector 102 on the front side thereof. By means of the pins, the circuit board 100 can be connected with a connector of an additional circuit board (not shown) mounted in the next carrier, and so on, so that the joined connectors together provide a connection bus for providing signals from the pixel array to the circuit boards of respective carriers 20. Similar to the rear plate 10, the front plate 30 defines heat fins 36 on the top and bottom for air passages and dissipation of heat generated by the enclosed pixel array and circuit board components. These fins align with those of the carrier(s) 20 and end plate 10 upon assembly so as to permit passage of air through these elements to cool the camera head enclosure.

The personality plate 40 can be fastened with the front plate 30 via one or more fasteners 300 such as screws, fed through matching openings 32. The front side of this personality plate 40 may be connected to a CCD array chip or circuit board 200 via one or more fasteners 300 (for example, screws) going through aligned mounting holes 41. The size of the personality plate and the position of mounting holes 41 defined therein can be made different to conform to the size and configuration of a particular CCD array chip or circuit board selected by a user. Thus, merely by changing the personality plate 40, the camera head enclosure can be adapted for an entirely different CCD array. The ability to select or replace the pixel array and circuit boards with those appropriate for different applications using relatively with the relatively minor modifications of changing the personality plate 40 and installing one or more related circuit boards in respective carriers 20, is a great benefit over previous devices of this kind.

A front cover 80, an aperture plate 70, and a back ring 60 are fastened to the front plate 30 as one unit. The back ring 60, which can be in a rectangular shape, is capable of being fastened to the front cover 80 so that the aperture plate 70 is sandwiched between them. The aperture plate 70 defines an opening 71, preferably in a circle shape, in the center of the plate. The opening 71 can be defined by a tube or hollow cylinder portion that extends transversely through the major surfaces of the aperture plate. This tube can be used to limit the angle at which light is permitted to enter the camera enclosure to illuminate the pixel array. The opening 71 is defined in the aperture plate so as to be positioned centrally relative to the pixel array regardless of the particular CCD array selected for use. To that end, the aperture plate 70 contains scalloped portions in the corner areas thereof (although not necessarily limited to the four corners of the array as shown in FIG. 9) to provide a degree of play to register the aperture relative to the pixel array 200. Fastener 300 such as threading bolts can be inserted through registered apertures of the front cover 80 and back ring 60 to hold the aperture plate 70 in registration with the pixel array 200. In addition, bolts can be extended through registered holes of the aperture assembly, front plate 30, carrier(s) 20, into threaded holes or the like defined in the rear plate 10. Upon tightening the same, the entire assembly is held together. The rear plate 10 can be left open to permit passage of electrically-conductive wires, cable, or the like for connection to an external device such as a camera controller unit. Alternatively, the mounting portions 108 of the rear plate 10 can support and receive a back cover 110 mounted thereto with screws or other fasteners 300. The back cover 110 can have a bushing 112 to permit wires, cable, or the like to extend through the back cover to make connections to an external device such as a camera controller or computer.

In operation, as shown in FIG. 9, almost every plate, carrier or ring in the exploded view may be fastened one to another very easily by means of a fastener fed through the matching holes. Especially, a user may add or delete one or more of the carriers to accommodate his/her need for a variable number of circuit boards. This is advantageous from the standpoint that the circuit boards can be made modular in terms of their functionality. By way of example, and not limitation, one circuit board can be configured to generate control signals to read data from the pixel or CCD array, another circuit board can be configured for storing or buffering the data from the pixel or CCD array, and yet another circuit board can be used to transmit the data to a camera controller for further processing according to a signal generated by such controller. Furthermore, the adjustable size and configuration of a fastening personality plate and the movability of the aperture plate allow a user to choose a CCD from a wide range of sizes. Each piece of the embodiments in FIG. 9, including each plate, carrier and ring, can be made from metal such as aluminum, plastic, or any other suitable material.

Figure 8:
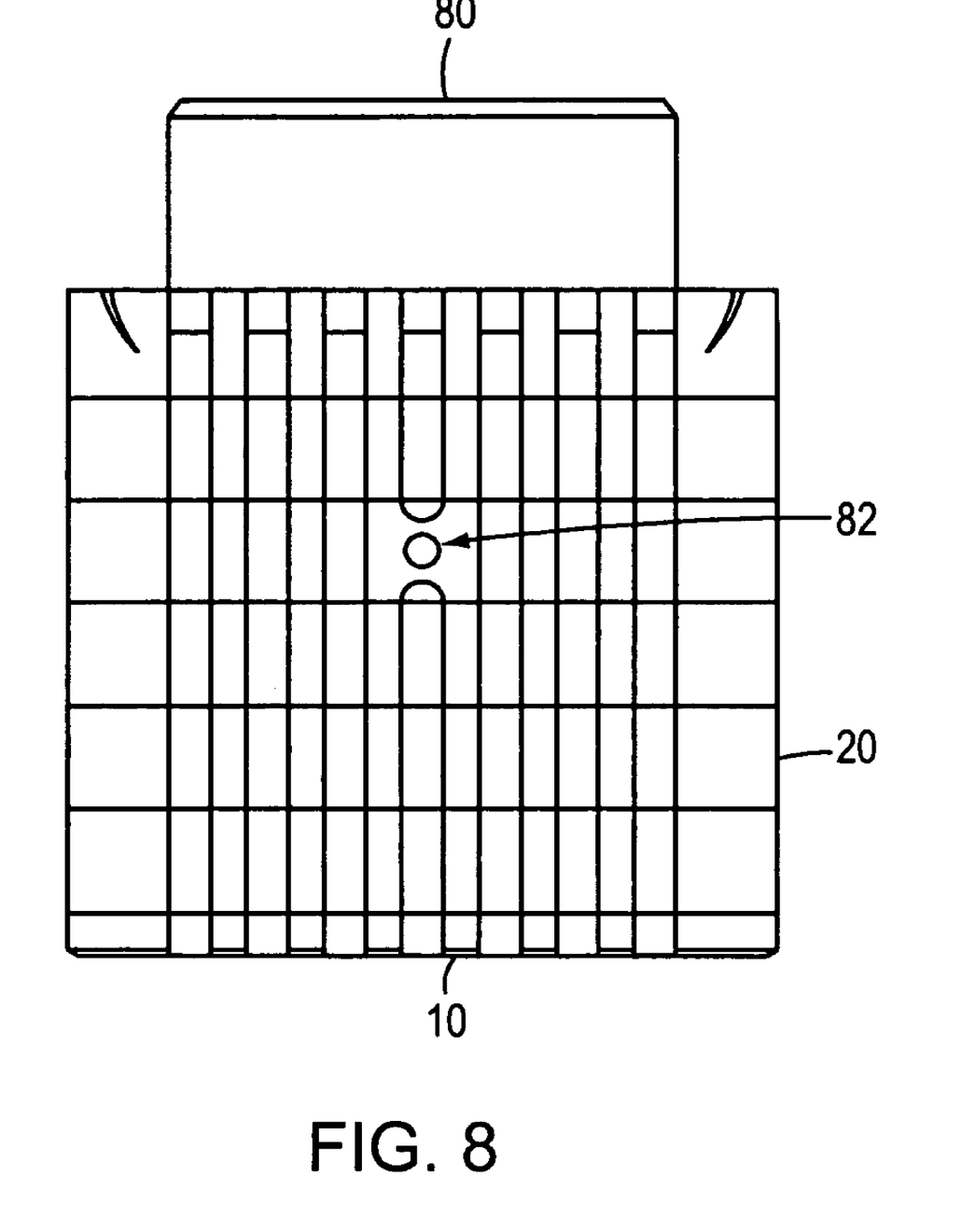
FIG. 8 is a bottom plan view of the bottom of a camera head embodying the invention.

As shown in FIG. 8, one of the carriers 20 can define a threaded hole 82 to receive the mount of a tripod, a mounting bracket, or other support device so that the camera can be supported and aligned relative to the object to be observed by the CCD camera. An external camera controller can generate signals such as clock or timing signals and a power supply which are provided to the pixel array and circuit boards housed within the enclosure. Based on the received signals, the enclosed pixel array and circuit board(s) generate signals provided to the external controller for processing to produce image data.

All other FIGS. 2-7 provide various views of the assembly of a camera head enclosure as shown in FIG. 1. These drawings do not show all the embodiments in the present inventions. Furthermore, each embodiment should not be construed as limited to the description set forth above, but may include a number of alternative variations. For example, plates 26 can have heat sink fins defined thereon to radiate heat away from the enclosure. Numerous other variations are possible without departing from the scope of the invention.

That which is claimed:

1. A camera head enclosure apparatus configured to allow the interchangeability of photo-electric pixel arrays, said apparatus comprising:

a personality plate configured to receive and secure a photo-electric pixel array of a specific configuration provided on a chip, said personality plate defining inner and outer apertures;

a photo-electric pixel array provided on a chip, said photo-electric pixel array chip defining apertures therein, said apertures corresponding with said outer apertures defined by said personality plate to receive respective fasteners to hold said photo-electric pixel array chip to said personality plate;

a front plate defining apertures therein, said apertures corresponding with said inner apertures defined by said personality plate to receive respective fasteners to hold said personality plate, and thereby also said photo-electric pixel array chip, to said front plate, said front plate further defines at least one slot and said photo-electric pixel array chip further defines at least one row of apertures aligned with said at least one slot defined by said front plate;

at least one connection strip comprising conductive pins attached thereon, said conductive pins inserted through a respective one of said row of apertures defined by said photo-electric pixel array chip, and further through a respective one of said slots defined by said front plate; and a circuit board associated with said photo-electric pixel array, said circuit board having a front side and a back side, and said circuit board comprising at least one connector on said front side to which said conductive pins attach.

2. The camera head enclosure apparatus of claim 1, said apparatus further comprising:

a carrier defining a mounting portion configured to receive and secure said circuit board.

3. The camera head enclosure apparatus of claim 2, said apparatus further comprising:

at least one additional carrier, each of said carriers having a back side and a front side comprising a first engagement portion and a second engagement portion, respectively, said first engagement portion configured to connect to said second engagement portion of another said carrier of said plurality of carriers; and at least one additional circuit board associated with said photo-electric pixel array and mounted on a respective carrier, said at least one connector on said front side of said circuit board defining holes containing conductors therein, said conductors electrically connected to pins on said back side of said circuit board, said pins configured to connect to a respective said connector on said front side of another circuit board in said plurality of circuit boards.

4. The camera head enclosure apparatus of claim 3 wherein at least one of said plurality of carriers defines a U-shape, said U-shaped carrier further defining an open end.

5. The camera head enclosure apparatus of claim 4, said apparatus further comprising:
at least one cover plate covering said open end of said at least one U-shaped carrier.

6. The camera head enclosure apparatus of claim 3, said apparatus further comprising:
a rear plate having a front side and a back side, said front side comprising an engagement portion configured to join with said first engagement portion of one of said plurality of carriers.

7. The camera head enclosure apparatus of claim 6 wherein said front plate, plurality of carriers, and rear plate further define an array of heat fins for dissipating heat generated by said plurality of circuit boards and said photo-electric pixel array.

8. The camera head enclosure apparatus of claim 6 wherein said rear plate is left open to permit passage of electrically-conductive wires for coupling to at least one of said plurality of circuit boards.

9. The camera head enclosure apparatus of claim 6 wherein said front plate, plurality of carriers, and rear plate define at least one set of aligned apertures extending therethrough to receive at least one fastener to hold said front plate, plurality of carriers and rear plate together.

10. The camera head enclosure apparatus of claim 6, said apparatus further comprising:
an aperture adjustment assembly defining apertures aligned with respective apertures defined in said front plate to receive fasteners to hold said aperture adjustment assembly to said front plate, said aperture adjustment assembly configured to adjust position of an aperture plate relative to said photo-electric pixel array to align an optical aperture defined in said aperture plate with said photo-electric pixel array.

11. The camera head enclosure apparatus of claim 10 wherein said aperture adjustment apparatus comprises:
a back ring with a central opening defined therein, said back ring further defining a plurality of apertures;
a front cover defining a plurality of apertures, said apertures aligned with said apertures defined by said back ring and defined to receive at least one fastener to connect to said back ring; and
an aperture plate defining an optical aperture aligned with said central opening of said back ring, said aperture plate sandwiched between said back ring and said front cover to hold said aperture plate in position so that said optical aperture of said aperture plate is aligned with said photo-electric pixel array to permit light to pass to said photo-electric pixel array.

12. The camera head enclosure apparatus of claim 11 wherein said aperture plate further defines scalloped portions on the corners of said aperture plate.

13. The camera head enclosure apparatus of claim 11 wherein said optical aperture defined by said aperture plate is further defined by a hollow cylinder portion, said hollow cylinder portion extending transversely through said aperture plate.

14. The camera head enclosure apparatus of claim 11, said apparatus further comprising:
a back cover mounted on said back side of said rear plate.

15. The camera head enclosure apparatus of claim 14 wherein said back cover further comprises a bushing to permit electrically-conductive wires for coupling to at least one of said plurality of circuit boards to extend through said back cover.

16. A camera head enclosure apparatus comprising:
a chip having a photo-electric pixel array thereon;
at least one carrier;
a circuit board mounted to said carrier;
a personality plate configured to receive and secure said chip having said photo-electric pixel array in said camera head enclosure in electrical contact with said circuit board;
a front plate having apertures aligned to at least one second aperture defined in the personality plate, the front plate and personality plate receiving respective fasteners through the apertures thereof to secure the personality plate, and thereby also the chip having the photo-electric pixel array, to the front plate, the front plate joining with the carrier on a first side thereof; and
at least one connection strip comprising conductive pins attached thereon, said conductive pins extending through a respective aperture row defined in said chip having a photo-electric pixel array and further through a respective slot defined in said front plate to connect to a respective connector on said circuit board.

17. The camera head enclosure apparatus of claim 16, said apparatus further comprising:
a rear plate secured to a second side of said carrier to enclose the circuit board therein.

18. The camera head enclosure apparatus of claim 17 wherein said rear plate defines an opening to permit passage of electrically-conductive wires for coupling to at least one said circuit board.

19. The camera head enclosure apparatus of claim 17 wherein said front plate, at least one carrier, and rear plate further define an array of heat fins for dissipating heat generated by said at least one circuit board and said photo-electric pixel array.

20. The camera head enclosure apparatus of claim 17 wherein said front plate, at least one carrier, and rear plate define at least one set of aligned apertures extending therethrough to receive at least one fastener to hold said front plate, at least one carrier, and rear plate together.

21. The camera head enclosure apparatus of claim 17, said apparatus further comprising:
an aperture adjustment assembly configured to adjust position of an aperture plate relative to said photo-electric pixel array to align an optical aperture defined in said aperture plate with said photo-electric pixel array.

22. The camera head enclosure apparatus of claim 21 wherein said aperture adjustment apparatus comprises:
a back ring defining an opening and at least one aperture;
a front cover defining at least one aperture aligned with a corresponding aperture of the back ring; and
an aperture plate including a tube defining an optical aperture, the apertures of the back ring and front cover, and apertures defined in the front plate, receiving respective fasteners to hold the aperture plate and its optical aperture in fixed relation to the front plate so that the optical aperture is positioned to permit light to pass through the aperture plate to the photo-electric pixel array.

23. The camera head enclosure apparatus of claim 22 wherein said aperture plate further defines scalloped portions on the corners of said aperture plate to provide clearance for passage of respective fasteners.

24. The camera head enclosure apparatus of claim 22, said apparatus further comprising:
- a back cover mounted on said rear plate on a side opposite said carrier.

25. The camera head enclosure apparatus of claim 24 wherein said back cover further comprises a bushing to permit electrically-conductive wires for coupling to at least one said circuit board to extend through said back cover.

26. A camera head enclosure apparatus comprising:
- a personality plate configured to receive and secure a photo-electric pixel array of a specific configuration provided on a chip, said personality plate defining inner and outer apertures;
- a photo-electric pixel array provided on a chip, said photo-electric pixel array chip defining apertures therein, said apertures corresponding with said outer apertures defined by said personality plate to receive respective fasteners to hold said photo-electric pixel array chip to said personality plate, said photo-electric pixel array chip further defining parallel spaced rows of apertures defined by conductive surfaces permitting electrical connection to the photo-electric pixel array;
- a front plate defining apertures therein, said apertures corresponding with said inner apertures defined by said personality plate to receive respective fasteners to hold said personality plate, and thereby also said photo-electric pixel array chip, to said front plate, said front plate further defining parallel spaced slots aligned with said parallel spaced rows of apertures defined by said photo-electric pixel array chip;
- at least one connection strip comprising conductive pins attached thereon, said conductive pins inserted through a respective one of said parallel spaced rows of apertures defined by said photo-electric pixel array chip, and further through a respective one of said parallel spaced slots defined by said front plate; and
- a circuit board associated with said photo-electric pixel array, said circuit board having a front side and a back side, said circuit board comprising parallel spaced connectors on said front side to which said conductive pins attach to electrically connect the photo-electric pixel array chip to the circuit board via the connection strip.

27. The camera head enclosure apparatus of claim 26, said apparatus further comprising:
- a carrier defining a mounting portion configured to receive and secure said circuit board.

28. The camera head enclosure apparatus of claim 27, said apparatus further comprising:
- at least one additional carrier, each of said carriers having a back side and a front side comprising a first engagement portion and a second engagement portion, respectively, said first engagement portion configured to connect to said second engagement portion of another said carrier of said plurality of carriers, said circuit board mounted on a respective on of said carriers; and
- at least one additional circuit board mounted on a respective carrier, said parallel spaced connectors on said front side of said circuit board defining holes containing conductors therein, said conductors electrically connected to parallel spaced pins on said back side of said circuit board, said parallel spaced pins configured to connect to a respective one of said parallel spaced connectors on said front side of the other said circuit board.

29. The camera head enclosure apparatus of claim 28, said apparatus further comprising:
- a rear plate having a front side and a back side, said front side comprising an engagement portion configured to join with said first engagement portion of one of said plurality of carriers.

30. The camera head enclosure apparatus of claim 29 wherein said front plate, plurality of carriers, and rear plate define at least one set of aligned apertures extending therethrough to receive at least one fastener to hold said front plate, plurality of carriers and rear plate together.

31. The camera head enclosure apparatus of claim 29, said apparatus further comprising:
- an aperture adjustment assembly defining apertures aligned with respective apertures defined in said front plate to receive fasteners to hold said aperture adjustment assembly to said front plate, said aperture adjustment assembly configured to adjust position of an aperture plate relative to said photo-electric pixel array to align an optical aperture defined in said aperture plate with said photo-electric pixel array.

32. The camera head enclosure apparatus of claim 31 wherein said aperture adjustment apparatus comprises:
- a back ring with a central opening defined therein, said back ring further defining a plurality of apertures;
- a front cover defining a plurality of apertures, said apertures aligned with said apertures defined by said back ring and defined to receive fasteners to connect to said back ring; and
- an aperture plate defining an optical aperture aligned with said central opening of said back ring, said aperture plate sandwiched between said back ring and said front cover to hold said aperture plate in position so that said optical aperture of said aperture plate is aligned with said photo-electric pixel array to permit light to pass through said aperture plate to said photo-electric pixel array.

33. The camera head enclosure apparatus of claim 32 wherein said apparatus further comprises:
- a back cover mounted on said back side of said rear plate.

34. A camera head enclosure apparatus comprising:
- a personality plate configured to receive and secure a photo-electric pixel array of a specific configuration provided on a chip, said personality plate defining inner and outer apertures;
- a photo-electric pixel array provided on a chip, said photo-electric pixel array chip defining apertures therein, said apertures corresponding with said outer apertures defined by said personality plate to receive respective fasteners to hold said photo-electric pixel array chip to said personality plate, said photo-electric pixel array chip further defining parallel spaced rows of apertures defined by conductive surfaces electrically connected to the photo-electric pixel array;
- a front plate defining apertures therein, said apertures corresponding with said inner apertures defined by said personality plate to receive respective fasteners to hold said personality plate, and thereby also said photo-electric pixel array chip, to said front plate, said front plate further defining parallel spaced slots aligned with said parallel spaced rows of apertures defined by said photo-electric pixel array chip;
- at least one connection strip comprising conductive pins attached thereon, said conductive pins inserted through a respective one of said parallel spaced rows of apertures defined by said photo-electric pixel array chip, and further through a respective one of said parallel spaced slots defined by said front plate;

a plurality of circuit boards associated with said photo-electric pixel array, each of said at least one circuit board having a front side and a back side, and each of said at least one circuit board comprising parallel spaced connectors on said front side to which said conductive pins attach to electrically connect the photo-electric pixel array chip to the circuit boards, said parallel spaced connectors defining holes containing conductors therein, said conductors electrically connected to parallel spaced pins on said back side of said circuit board, said parallel spaced pins configured to connect to a respective one of said parallel spaced connectors on said front side of another circuit board in said plurality of circuit boards;

a plurality of carriers defining a mounting portion configured to receive and secure one of said at least one circuit board, each of said at least one carrier having a back side and a front side comprising a first engagement portion and a second engagement portion respectively, said first engagement portion configured to connect to said second engagement portion of another said carrier; and a rear plate having a front side and a back side, said front side comprising an engagement portion configured to join with said first engagement portion of one of said carriers.

35. The camera head enclosure apparatus of claim 34 wherein said front plate, carriers, and rear plate define at least one set of aligned apertures extending therethrough to receive at least one fastener to hold said front plate, carriers, and rear plate together.

36. The camera head enclosure apparatus of claim 34, said apparatus further comprising:

an aperture adjustment assembly defining apertures aligned with respective apertures defined in said front plate to receive fasteners to hold said aperture adjustment assembly to said front plate, said aperture adjustment assembly configured to adjust position of an aperture plate relative to said photo-electric pixel array to align an optical aperture defined in said aperture plate with said photo-electric pixel array.

37. The camera head enclosure apparatus of claim 36 wherein said aperture adjustment apparatus comprises:

a back ring with a central opening defined therein, said back ring further defining a plurality of apertures;

a front cover defining a plurality of apertures, said apertures aligned with said apertures defined by said back ring and defined to receive fasteners to connect to said back ring; and an aperture plate defining an optical aperture aligned to said central opening of said back ring, said aperture plate sandwiched between said back ring and said front cover to hold said aperture plate in position so that said optical aperture of said aperture plate is aligned with said photo-electric pixel array to permit light to pass through said aperture plate to said photo-electric pixel array.

38. The camera head enclosure apparatus of claim 37, said apparatus further comprising:

a back cover mounted on said back side of said rear plate.

\* \* \* \* \*